(12) United States Patent
Karuppiah et al.

(10) Patent No.: US 11,405,325 B2
(45) Date of Patent: Aug. 2, 2022

(54) IN-BAND-TELEMETRY-BASED PATH MTU SIZE DETERMINATION SYSTEM

(71) Applicant: Dell Products L.P., Round Rock, TX (US)

(72) Inventors: Kannan Karuppiah, Santa Clara, CA (US); Ganesh Chennimalai Sankaran, TamilNadu (IN)

(73) Assignee: Dell Products L.P., Round Rock, TX (US)

( * ) Notice: Subject to any disclaimer, the term of this patent is extended or adjusted under 35 U.S.C. 154(b) by 471 days.

(21) Appl. No.: 16/432,736

(22) Filed: Jun. 5, 2019

(65) Prior Publication Data

US 2020/0389409 A1    Dec. 10, 2020

(51) Int. Cl.
*H04L 47/36* (2022.01)
*H04L 47/33* (2022.01)

(52) U.S. Cl.
CPC ............ *H04L 47/365* (2013.01); *H04L 47/33* (2013.01)

(58) Field of Classification Search
CPC ... H04L 47/365; H04L 47/33; H04L 12/4633; H04L 69/22; H04L 45/02; H04L 49/9042; H04L 69/04; H04L 12/4641; H04W 28/06
See application file for complete search history.

(56) References Cited

U.S. PATENT DOCUMENTS

| | | | |
|---|---|---|---|
| 2005/0281288 A1* | 12/2005 | Banerjee | H04L 47/10 370/477 |
| 2008/0159150 A1* | 7/2008 | Ansari | H04L 45/02 370/238 |
| 2008/0165775 A1* | 7/2008 | Das | H04L 47/36 370/392 |
| 2015/0071292 A1* | 3/2015 | Tripathi | H04L 47/196 370/392 |
| 2015/0341278 A1* | 11/2015 | Sundar | H04L 47/36 370/392 |
| 2017/0366401 A1* | 12/2017 | Jiang | H04L 41/0866 |
| 2019/0104062 A1* | 4/2019 | Taylor | H04L 45/74 |
| 2020/0186465 A1* | 6/2020 | Dontula Venkata | H04L 41/0896 |

* cited by examiner

*Primary Examiner* — Ian N Moore
*Assistant Examiner* — Latresa A McCallum
(74) *Attorney, Agent, or Firm* — Joseph Mencher (57) ABSTRACT

A path MTU size determination system includes a source host device that generates and transmits a path MTU size discovery packet. A plurality of switch devices in the path MTU size determination system provide a network path that couples a destination host device to the source host device. Each of the switch devices is configured to receive the path MTU size discovery packet transmitted by the source host device, provide a switch identity of that switch device and a MTU size supported by that switch device in a MTU size reporting header included in the MTU size discovery packet, and forward the path MTU size discovery packet. One of the switch devices will operate to determine a lowest MTU size in the MTU size reporting header, and another of the switch devices will cause the source host device to provide the lowest MTU size as its path MTU size.

20 Claims, 9 Drawing Sheets

IN-BAND-TELEMETRY-BASED PATH MTU SIZE DETERMINATION SYSTEM

BACKGROUND

The present disclosure relates generally to information handling systems, and more particularly to determining a path MTU size in a network path between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, client devices and server devices, are often connected together by switch devices in order to provide a network path between the client device(s) and/or server device(s) that enables the exchange of information between those devices. However, switch devices that provide the network path may include different packet transmission capabilities associated with the maximum size of a packet (called the Maximum Transmission Unit (MTU) size) supported by those switch devices. As such, path MTU discovery operations are often performed for the network path to determine a path MTU for packets sent by source client/server devices ("source devices" below) to destination client/server devices ("destination devices" below) that will allow for the communication of those packets by the switch devices without the need to fragment any of those packets to comply with the MTU size supported by any of the switch devices that provide the network path.

For example, a source device may perform conventional path MTU discovery operation by setting a Don't Fragment (DF) flag bit in the Internet Protocol (IP) header of a path MTU discovery packet that is transmitted along a network path to a destination device. Switch devices that provide the network path will forward that path MTU discovery packet if they support an MTU size that is greater than the size of the path MTU discovery packet, while any switch device that provides that network path will drop that path MTU discovery packet if its supported MTU size is smaller than the size of the path MTU discovery packet, and send an Internet Control Message Protocol (ICMP) fragmentation needed message (e.g., with Type 3, Code 4 ICMP parameters) that includes the MTU size supported by that switch device to the source device. In response to receiving the ICMP fragmentation needed message, the source device will reduce its path MTU size to the MTU size that is supported by that switch device, and then will repeat the process (sending a new path MTU discovery packet and adjusting its path MTU size to an MTU size supported by any switch device that sends back an ICMP fragmentation message that includes its supported MTU size) until the path MTU size of the source device is sufficient for packets generated and transmitted by that source device to reach a destination device via the network path without being fragmented.

As will be appreciated by one of skill in the art in possession of the present disclosure, the path MTU discovery operations discussed above are iterative, and require the generation and sending of a new path MTU discovery packet each time a switch device the provides the network path is encountered that does not support the current path MTU size utilized by the source device. Furthermore, the path MTU discovery operations discussed above are support by Layer 3 (L3) switch devices, but are not supported by Layer 2 (L2) switch devices. For example, L2 switch devices receiving a path MTU discovery packet will drop that path MTU discovery packet if their supported MTU size is less than the size of the path MTU discovery packet, but are not configured to send the ICMP fragmentation messages discussed above. As such, path MTU discovery operations performed on a network path that includes L2 switch devices will fail when L2 switch devices support an MTU size that is less than the current path MTU size of the source device. Such failures typically the source device then blindly and iterative lowering its path MTU size until the L2 switch device that caused the failure of the path MTU discovery operations is able to handle a packet with that path MTU size. Thus, conventional path MTU discovery operations can be time consuming operations.

Accordingly, it would be desirable to provide an improved path MTU discovery system.

SUMMARY

According to one embodiment, an Information Handling System (IHS) includes a processing system; and a memory system that is coupled to the processing system and that includes instructions that, when executed by the processing system, cause the processing system to provide a Maximum Transmission Unit (MTU) size reporting engine that is configured to: receive a path MTU size discovery packet generated and transmitted by a source host device; provide a switch identity and a supported MTU size in a MTU size reporting header included in the MTU size discovery packet; and forward the path MTU size discovery packet.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
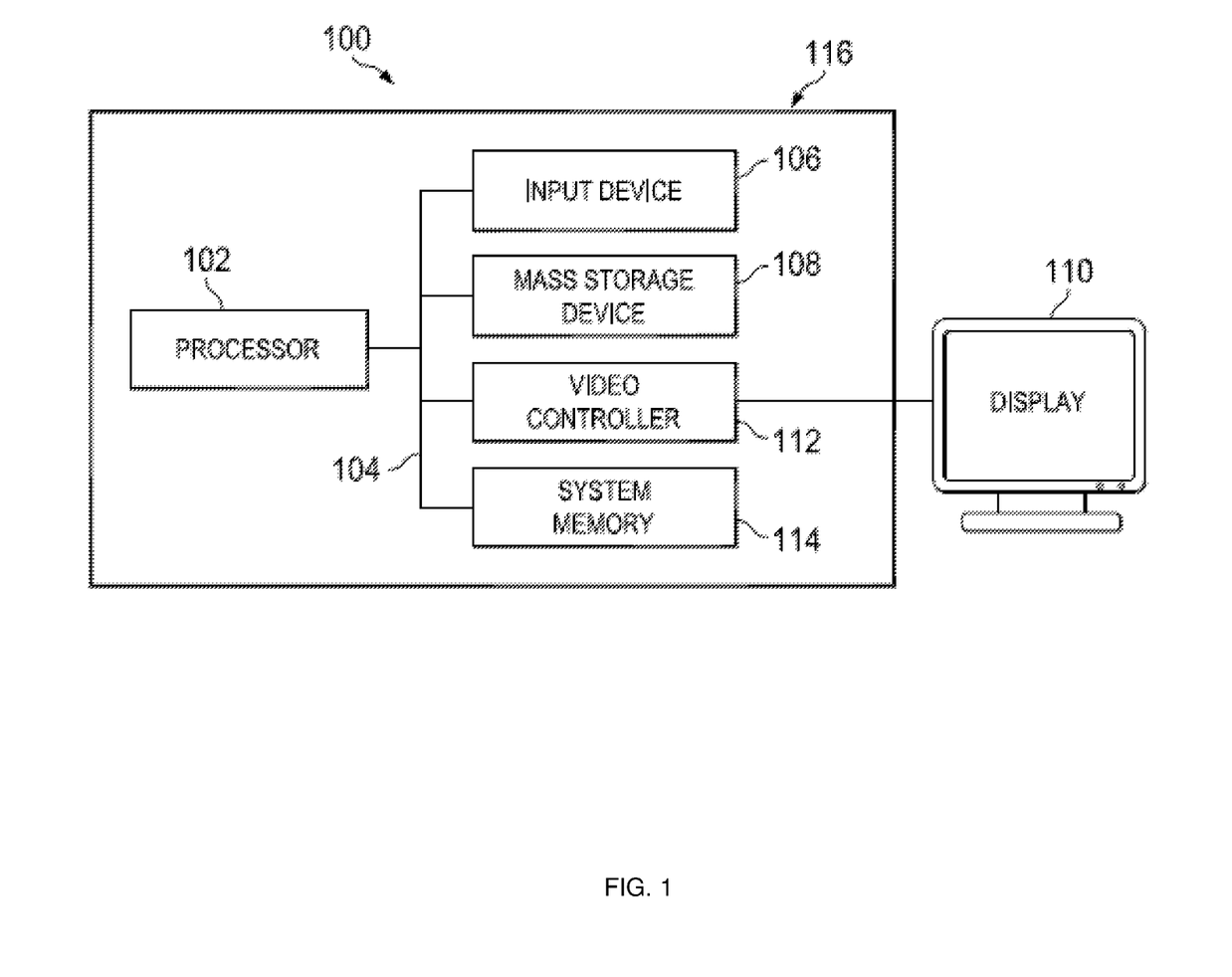
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
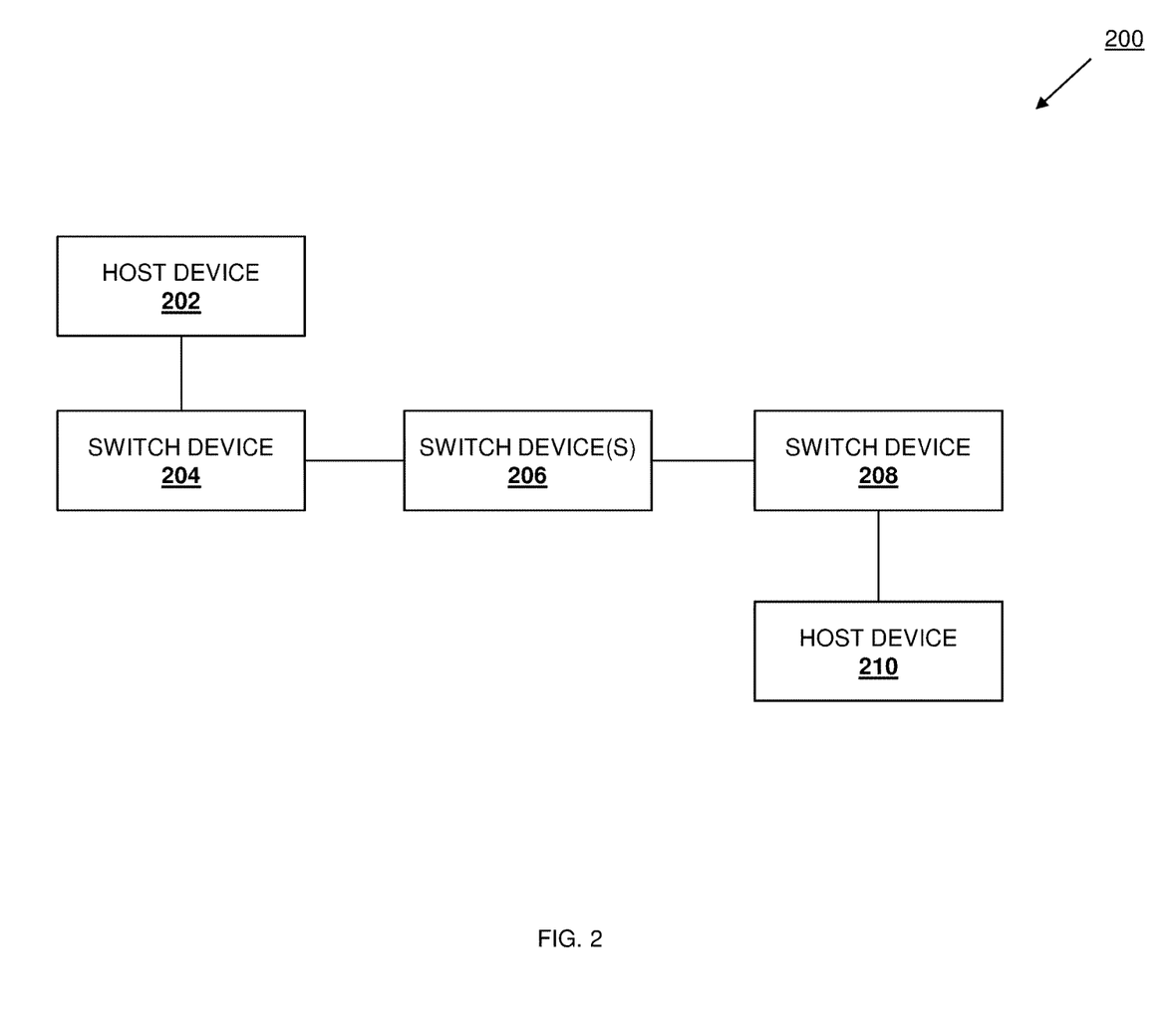
FIG. 2 is a schematic view illustrating an embodiment of a networked system providing a network path between host devices.

Referring now to FIG. 2, an embodiment of a networked system 200 is illustrated that may provide the in-band-telemetry-based path MTU size determination system of the present disclosure. In the illustrated embodiment, the networked system 200 includes a host device 202 coupled via a plurality of switch devices 204, 206, and 208 to a host device 210. In an embodiment, either or both of the host devices 202 and 210 may be provided by the IHS 100 discussed above with reference to FIG. 1, and/or may include some or all of the components of the IHS 100, and one of skill in the art in possession of the present disclosure will recognize that the host devices discussed below may be provided by client devices and/or server devices. However, while illustrated and discussed as being provided by client devices and/or server devices, one of skill in the art in possession of the present disclosure will recognize that host devices 202 and 210 provided in the networked system 200 may include any devices that may be configured to operate similarly as the host devices 202 and 210 discussed below. In the specific examples provided below, the host device 202 is described as operating as a source host device and the host device 210 is described as operating as a destination host device, but one of skill in the art in possession of the present disclosure will recognize that the either of the host devices 202 and 210 may operate as source host devices or destination host devices in different communication situations while remaining within the scope of the present disclosure as well.

Similarly, any or all of switch devices 204, 206, and 208 may be provided by the IHS 100 discussed above with reference to FIG. 1, and/or may include some or all of the components of the IHS 100. Furthermore, while illustrated and discussed as being provided by switch devices, one of skill in the art in possession of the present disclosure will recognize that switch devices 204, 206, and 208 provided in the networked system 200 may include bridge devices and/or any other devices that may be configured to provide a network path between the host devices 202 and 210 and operate similarly as the switch devices 204, 206, and 208 discussed below. In the specific examples provided below, the switch device 204 is described as operating as a source telemetry device and the switch device 208 is described as operating as a sink telemetry device, while the switch device(s) 206 provide one or more intermediate switch devices providing the portion of the network path between the host devices 202 and 210, but one of skill in the art in possession of the present disclosure will recognize that different numbers and/or configurations of switch devices (e.g., providing multiple different network paths between the host devices 202 and 210) may be provided in the networked system 200 while remaining within the scope of the present disclosure as well. While a specific networked system 200 has been illustrated and described, one of skill in the art in possession of the present disclosure will recognize that the system of the present disclosure may include a variety of components and component configurations while remaining within the scope of the present disclosure as well.

Figure 3:
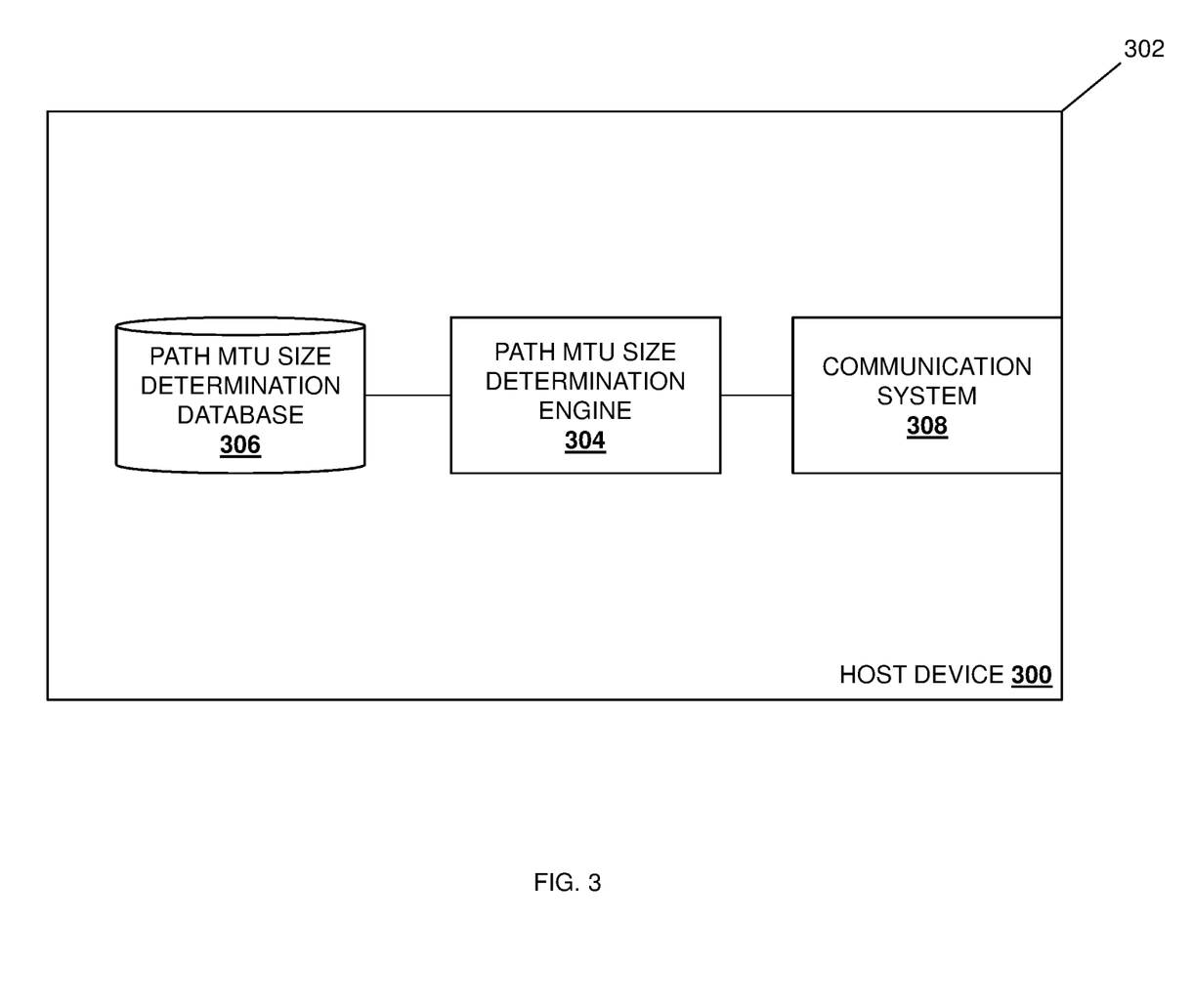
FIG. 3 is a schematic view illustrating an embodiment of a host device that may be included in the networked system of FIG. 2.

Referring now to FIG. 3, an embodiment of a host device 300 is illustrated that may provide either or both of the host devices 202 and 210 discussed above with reference to FIG. 2. As such, the host device 300 may be provided by the IHS 100 discussed above with reference to FIG. 1 and/or may include some or all of the components of the IHS 100. Furthermore, while illustrated and discussed as a client device and/or server device, one of skill in the art in possession of the present disclosure will recognize that the functionality of the host device 300 discussed below may be provided by other devices that are configured to operate similarly as the host device 300 discussed below. In the illustrated embodiment, the host device 300 includes a chassis 302 that houses the components of the host device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a path MTU size determination engine 304 that is configured to perform the functionality of the path MTU size determination engines and/or host devices discussed below.

The chassis 302 may also house a storage system (not illustrated, but which may include the storage 108 discussed above with reference to FIG. 1) that is coupled to the path MTU size determination engine 304 (e.g., via a coupling between the storage system and the processing system) and that includes a path MTU size determination database 306 that is configured to store any of the information utilized by the path MTU size determination engine 304 discussed below. The chassis 302 may also house a communication system 308 that is coupled to the path MTU size determination engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific host device 300 has been illustrated, one of skill in the art in possession of the present disclosure will recognize that host devices (or other devices operating according to the teachings of the present disclosure in a manner similar to that described below for the host device 300) may include a variety of components and/or component configurations for providing conventional host device functionality (e.g., client device functionality, server device functionality, etc.), as well as the functionality discussed below, while remaining within the scope of the present disclosure as well.

Figure 4:
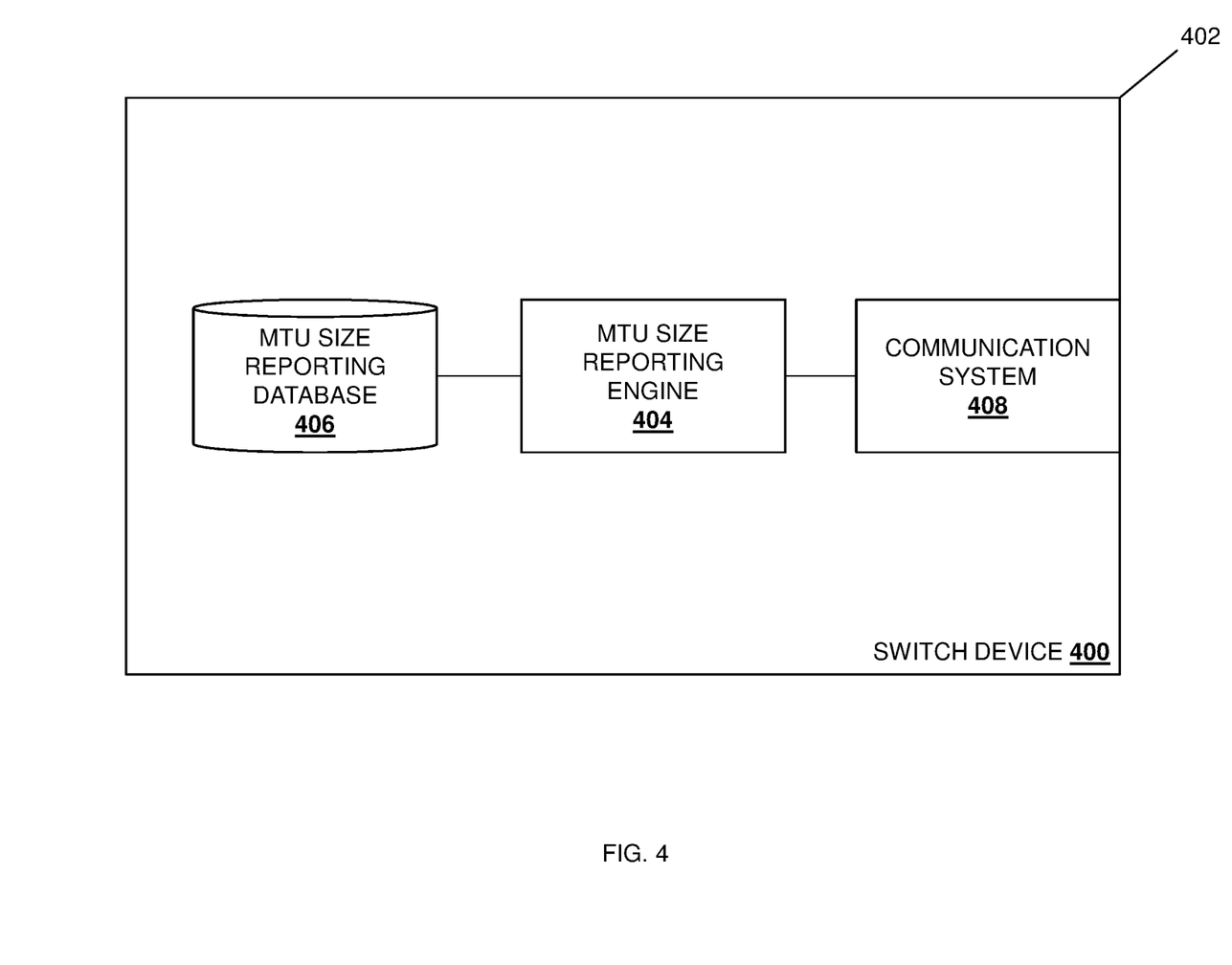
FIG. 4 is a schematic view illustrating an embodiment of a switch device that may be included in the networked system of FIG. 2.

Referring now to FIG. 4, an embodiment of a switch device 400 is illustrated that may provide any or all of the switch devices 204, 206, and 210 discussed above with reference to FIG. 2. As such, the switch device 400 may be provided by the IHS 100 discussed above with reference to FIG. 1 and/or may include some or all of the components of the IHS 100. Furthermore, while illustrated and discussed as a switch device, one of skill in the art in possession of the present disclosure will recognize that the functionality of the switch device 400 discussed below may be provided by bridge devices and/or other devices that are configured to operate similarly as the switch device 400 discussed below. In the illustrated embodiment, the switch device 400 includes a chassis 402 that houses the components of the switch device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an MTU size reporting engine 404 that is configured to perform the functionality of the MTU size reporting engines and/or switch devices discussed below.

The chassis 402 may also house a storage system (not illustrated, but which may include the storage 108 discussed above with reference to FIG. 1) that is coupled to the MTU size reporting engine 404 (e.g., via a coupling between the storage system and the processing system) and that includes a MTU size reporting database 406 that is configured to store any of the information utilized by the MTU size reporting engine 404 discussed below. The chassis 402 may also house a communication system 408 that is coupled to the MTU size reporting engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific switch device 400 has been illustrated, one of skill in the art in possession of the present disclosure will recognize that switch devices (or other devices operating according to the teachings of the present disclosure in a manner similar to that described below for the switch device 400) may include a variety of components and/or component configurations for providing conventional switch device functionality, as well as the functionality discussed below, while remaining within the scope of the present disclosure as well.

Figure 5:
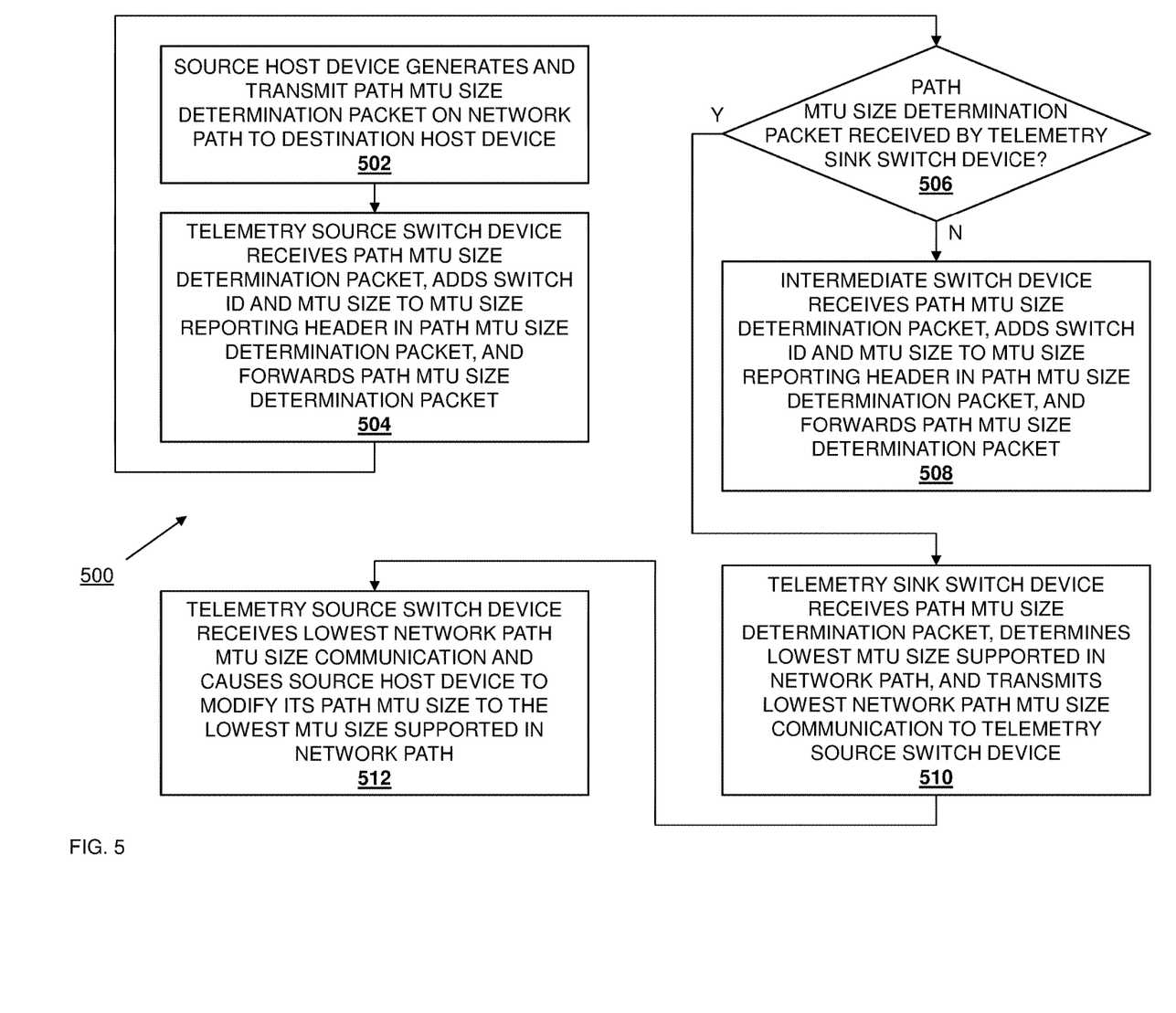
FIG. 5 is a flow chart illustrating an embodiment of a method for determining a path MTU size.

Referring now to FIG. 5, an embodiment of a method 500 for determining a path MTU size is illustrated. As discussed below, embodiments of the systems and methods of the present disclosure provide for the determination of a source host device path MTU size via the transmission of a single path MTU size determination packet along a network path to a destination host device. For example, path MTU size determination packets generated by source host devices may be provided with In-band Network Telemetry (INT) headers (e.g., added by the source host device or a telemetry source switch device that is directly connected to the source host device), and switch devices in the network path that receive the path MTU size determination packet will provide their switch identifiers along with their supported MTU size in the INT header, and forward the path MTU size determination packet. When a telemetry sink switch device in the network path (e.g., that is directly connected to the destination host device) receives the path MTU size determination packet, it may determine a lowest MTU size supported in the network path (i.e., out of the MTU sizes reported in the INT header in the path MTU size determination packet and the MTU size supported by the telemetry sink switch device), and report that lowest MTU size to the telemetry source switch device. The telemetry source switch device then causes the source host device to change its path MTU size to the lowest MTU size supported by the network path. As such, the path MTU size determination system of the present disclosure eliminates the iterative path MTU discovery operations performed in conventional path MTU size determination systems, and allows for the determination of MTU sizes supported by L2 switch devices that provide the network path.

Figure 6A:
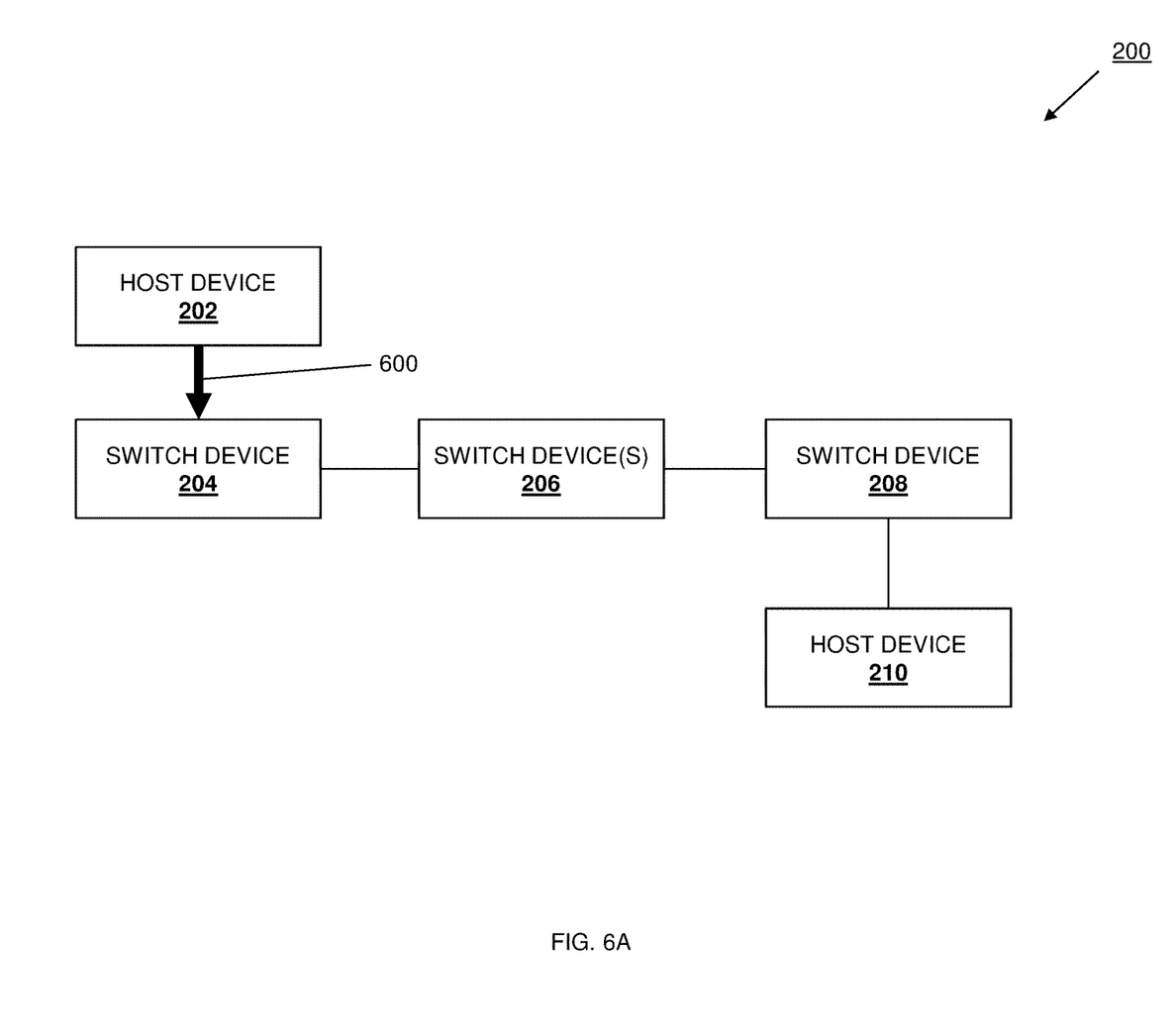
FIG. 6A is a schematic view illustrating an embodiment of the networked system of FIG. 2 operating during the method of FIG. 5 to perform a path MTU size determination.

The method 500 begins at block 502 where a source host device generates and transmits a path MTU size determination packet on a network path to a destination host device. In an embodiment, at block 502, the path MTU size determination engine 304 in the host device 202/300 may operate to generate a path MTU size determination packet and, as illustrated in FIG. 6A, transmit the path MTU size determination packet 600 via its communication system 308 to the switch device 204. In some embodiments, the path MTU size determination packet generated and transmitted by the host device 202 at block 502 may be a dedicated path MTU size determination packet that is generated and transmitted for the purposes of determining a path MTU size. However, in other embodiments, the path MTU size determination packet generated and transmitted by the host device 202 at block 502 may be provided as part of another packet (e.g., a data communication packet, a control packet, and/or other packets that would be apparent to one of skill in the art in possession of the present disclosure) that is generated for reasons other than determining a path MTU size, but that allows for the performance of the path MTU size determinations discussed below.

In some embodiments, the path MTU size determination packet may be generated and transmitted by the host device 202 prior to, or as part of, the initialization of communications between the host device 202 and the host device 210. However, one of skill in the art in possession of the present disclosure will recognize that the lowest MTU supported by a network path may change over time, and thus, the path MTU size determination packet may be generated and transmitted by the host device 202 following the initialization of communications between the host device 202 and the host device 210 and/or at any time(s) during the communications between the host device 202 and the host device 210 while remaining within the scope of the present disclosure as well. As discussed below, in some embodiments, the host device 202 may be configured to add an MTU size reporting header such as, for example, an In-band Network Telemetry (INT) header, to the path MTU size determination packet generated at block 502 prior to transmitting the path MTU size determination packet. In those embodiment, the INT header added to the path MTU size determination packet by the host device 202 may include a hop-by-hop designation, a switch identifier field, an MTU size reporting field, and/or other information that one of skill in the art in possession of the present disclosure will recognize will provide for the functionality discussed below that results in switch devices adding their supported MTU sizes to the path MTU size determination packet. As will appreciated by one of skill in the art in possession of the present disclosure, any of the fields discussed above may be new fields added to a P4 header. However, in other embodiments, the host device 202 may not be configured to add an In-band Network Telemetry (INT) header to the path MTU size determination packet generated at block 502 prior to transmitting the path MTU size determination packet, and thus the path MTU size determination packet may be transmitted at block 502 without the MTU size reporting header/INT header. Furthermore, while discussed as being provided by an INT header, one of skill in the art in possession of the present disclosure will recognize that the MTU size reporting header may be provided by any data structure that provides for similar functionality while remaining within the scope of the present disclosure as well.

The method 500 then proceeds to block 504 where a telemetry source switch device receives the path MTU size determination packet, adds a switch identifier and an MTU size to the path MTU size determination packet, and forwards the path MTU size determination packet. In an embodiment, at block 504 and as illustrated in FIG. 6A, the switch device 204 may operate as a telemetry source switch device that is directly connected to the host device 202 such that it is the first switch device in the network path between the host devices 202 and 210 that receives the path MTU size determination packet 600. However, in other embodiments, the telemetry source switch device may be provided by any switch device in the network path between the host devices 202 and 210 that is the first switch device that receives the path MTU size determination packet generated and transmitted by the source host device.

As such, at block 504, the MTU size reporting engine 404 in the switch device 204/400 may receive the path MTU size determination packet 600 via its communication system 408. As discussed above, in some embodiments the host device 202 may have added the INT header to the path MTU size determination packet at block 502 and, in response to receiving the path MTU size determination packet with an INT header, the MTU size reporting engine 404 in the switch device 204/400 may provide its switch identifier (e.g., a Media Access Control (MAC) address and/or other switch identification information known in the art) in a switch identifier field provided in the INT header included in the path MTU size determination packet 600, along with an MTU size that is supported by the switch device 204 in a MTU size reporting field provided in the INT header included in the path MTU size determination packet 600.

Figure 6B:
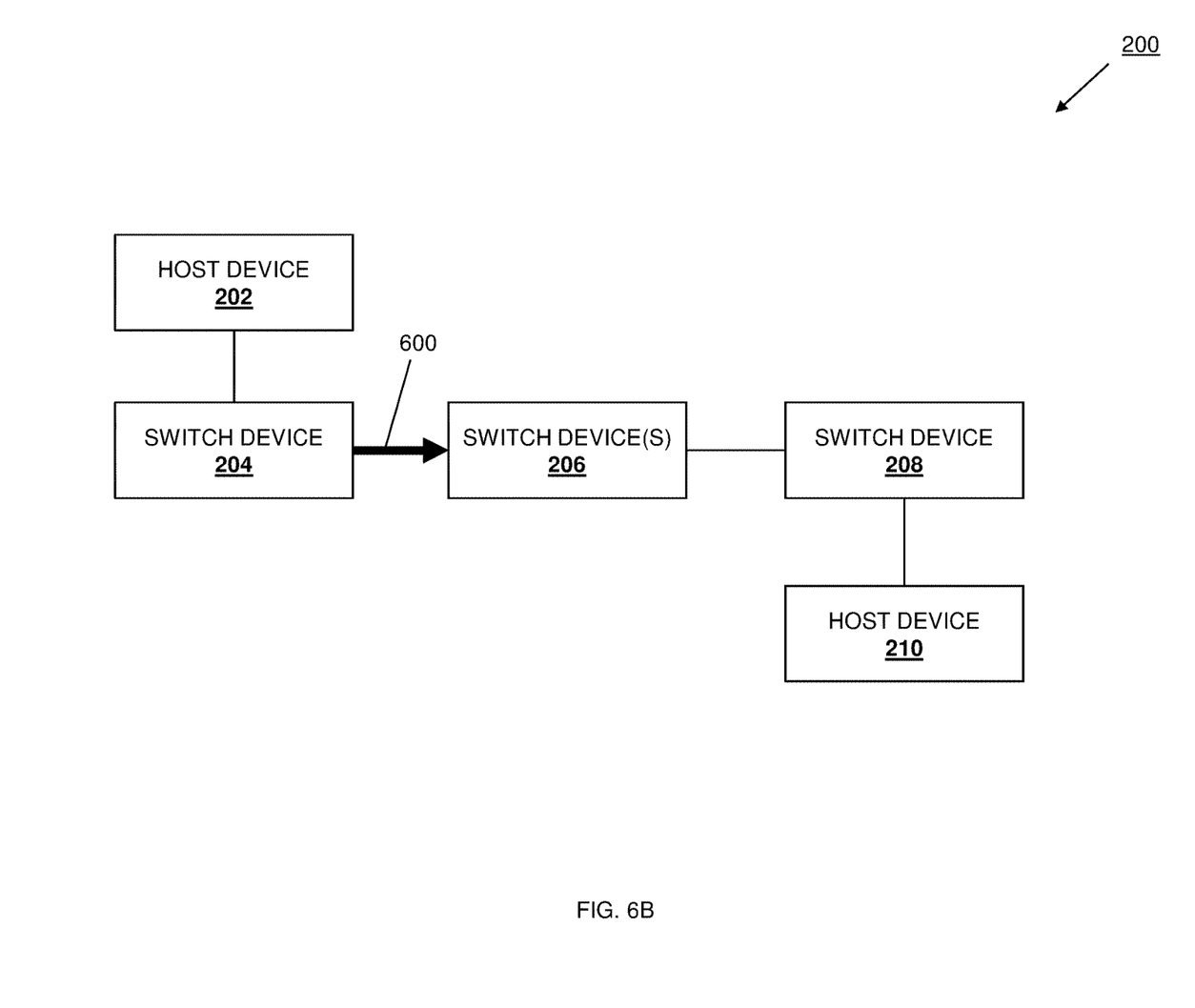
FIG. 6B is a schematic view illustrating an embodiment of the networked system of FIG. 2 operating during the method of FIG. 5 to perform a path MTU size determination.

However, in embodiments in which the host device 202 is not configured to add an INT header to the path MTU size determination packet, the MTU size reporting engine 404 in the switch device 204/400 (operating as a telemetry source switch device) may be configured to add the INT header discussed above to the path MTU size determination packet received at block 504, and provide its switch identifier (e.g., a Media Access Control (MAC) address and/or other switch identification information known in the art) in a switch identifier field provided in the INT header, along with an MTU size that is supported by the switch device 204 in a MTU size reporting field provided in the INT header. Similarly as discussed above, in some examples the switch identifier for the switch device and the MTU size supported by that switch device may be linked in the INT header such that the switch device is associated with its supported MTU size in the INT header of the path MTU size determination packet. As illustrated in FIG. 6B, after identifying itself and its supported MTU size in the path MTU size determination packet, the MTU size reporting engine 404 in the switch device 204/400 may forward the path MTU size determination packet 600 to the switch device(s) 206. In some embodiments, the switch device 204 operating as a telemetry source switch device will transmit the path MTU size determination packet 600 to the switch device 208 operating as a telemetry sink switch device, which may include setting a flag in a P4 header of the path MTU size determination packet 600 as a destination flag that causes the switch devices 206 operating as intermediate switch devices to not perform parsing operations on the path MTU size determination packet.

The method 500 then proceeds to decision block 506 where the method 500 may proceed differently depending on whether the path MTU size determination packet is received by a telemetry sink switch device. As discussed below, the path MTU size determination packet may have switch device identifiers and supported MTU sizes added to its INT header and may be forwarded along the network path by the telemetry source switch device (e.g., the switch device 204) and intermediate switch device(s) (e.g., the switch device(s) 206) until it reaches the telemetry sink switch device (e.g., the switch device 208.) As such, if at decision block 506, the path MTU size determination packet is received by an intermediate switch device rather than a telemetry sink switch device, the method 500 proceeds to block 508 where the intermediate switch device receives the path MTU size determination packet, adds its switch identifier and its supported MTU size to the path MTU size determination packet, and forwards the path MTU size determination packet.

In an embodiment, at block 508, the MTU size reporting engine 404 in any of the switch device(s) 206/400 may receive the path MTU size determination packet 600 via its communication system 408 and, in response, may provide its switch identifier (e.g., a Media Access Control (MAC) address and/or other switch identification information known in the art) in a switch identifier field provided in the INT header included in the path MTU size determination packet 600, along with an MTU size that is supported by that switch device 206 in a MTU size reporting field provided in the INT header included in the path MTU size determination packet 600. As discussed above, in some examples the switch identifier for the switch device and the MTU size supported by that switch device may be linked in the INT header such that the switch device is associated with its supported MTU size in the INT header of the path MTU size determination packet. After identifying itself and its supported MTU size in the path MTU size determination packet, the MTU size reporting engine 404 in the switch device 206/400 may forward the path MTU size determination packet 600. As such, the method 500 may loop through blocks 506 and 508 as long as the path MTU size determination packet is being received by intermediate switch devices in the network path between the host devices 202 and 210, with results in those intermediate switch devices identifying themselves and their supported MTU size in the path MTU size determination packet as it is forwarded along with network path between the host devices 202 and 210.

Figure 6C:
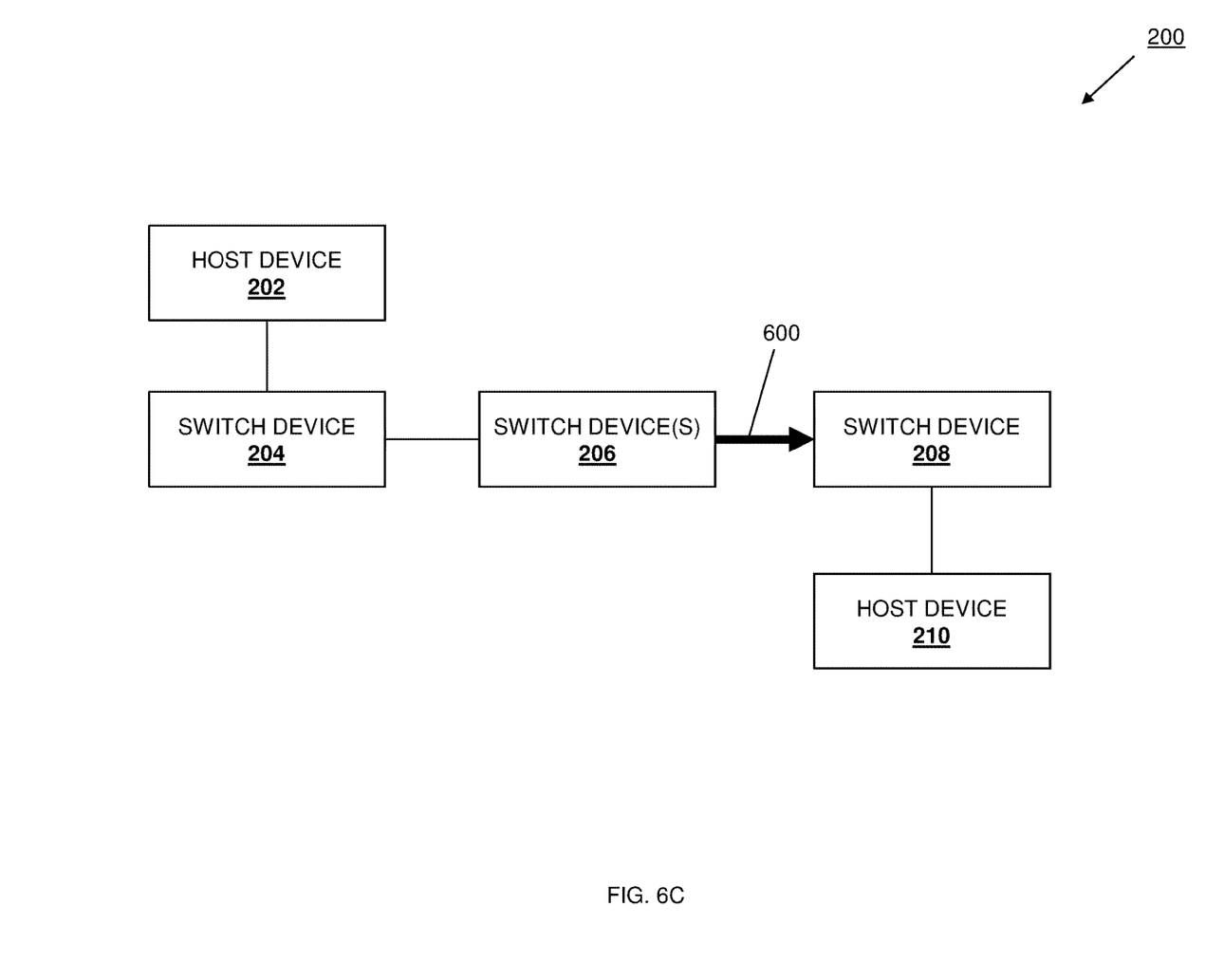
FIG. 6C is a schematic view illustrating an embodiment of the networked system of FIG. 2 operating during the method of FIG. 5 to perform a path MTU size determination.

If at decision block 506, the path MTU size determination packet is received by a telemetry sink switch device, the method 500 proceeds to block 510 the telemetry sink switch device receives the path MTU size determination packet, determines a lowest MTU size supported in the network path, and transmits a lowest network path MTU size communication to the telemetry sink switch device. In an embodiment, at block 510 and as illustrated in FIG. 6C, the final intermediate switch device included in the switch device(s) 206 may forward the path MTU size determination packet 600 to the switch device 208 that operates as a telemetry sink switch device in this example. As such, at block 510 the MTU size reporting engine 404 in the switch device 210/400 may receive the path MTU size determination packet 600 via its communication system 408 and, in response, may access the INT header in the path MTU size determination packet 600 and identify the MTU sizes reported by each of the switch devices in the network path as being supported by those switch devices (e.g., by parsing the INT header to identify the lowest MTU size reported by the switch devices). The MTU size reporting engine 404 in the switch device 208/400 may then determine a lowest supported MTU size for the network path from the MTU sizes reported in the INT header of the path MTU size determination packet by the switch devices in the network path, and the MTU size supported by the switch device 208. As will be appreciated by one of skill in the art in possession of the present disclosure, of the MTU size supported by the switch device 208 and the MTU sizes reported as being supported by the switch device(s) 206 and the switch device 204, a lowest MTU size supported by one or more of those switch devices may be identified at block 510. Furthermore, in some embodiments the switch device 208 operating as a telemetry sink switch device may ignore the payload included in the path MTU size determination packet, and simply parse the INT header in the path MTU size determination packet to identify the lowest supported MTU size for the network path. The MTU size reporting engine 404 in the switch device 210/400 may then generate a lowest network path MTU size communication and, as illustrated in FIG. 6D, transmit the lowest network path MTU size communication 602 to the switch device(s) 206, which operate to forward that lowest network path MTU size communication 602 until it reaches the switch device 204 that is operating as a telemetry source device in this example.

The method 500 then proceeds to block 512 where the telemetry source switch device receives the lowest network path MTU size communication and causes the source host device to modify its path MTU size to the lowest MTU size supported in the network path. In an embodiment, at block 512, the MTU size reporting engine 404 in the switch device 204/400 may receive the lowest network path MTU size communication 602 via its communication system 408 and, in response, may identify the lowest MTU size supported in the network path by the switch devices 204, 206, and 208. Subsequent to identifying the lowest MTU size supported in the network path by the switch devices 204, 206, and 208, the MTU size reporting engine 404 in the switch device 204/400 may use that lowest MTU size supported in the network path by the switch devices 204, 206, and 208 in order to cause the host device 202 to modify its path MTU size to the lowest MTU size supported in the network path by the switch devices 204, 206, and 208.

Figure 6D:
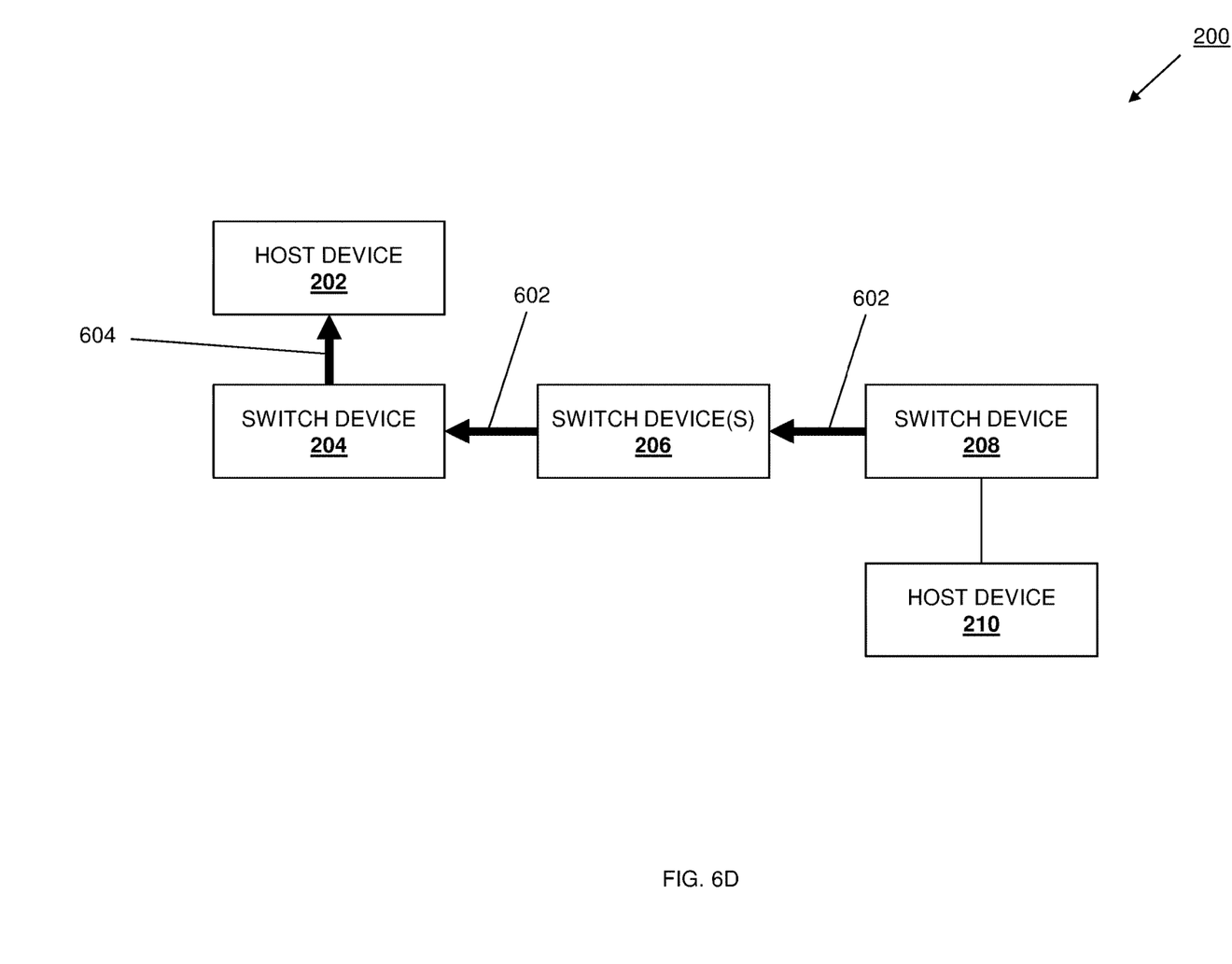
FIG. 6D is a schematic view illustrating an embodiment of the networked system of FIG. 2 operating during the method of FIG. 5 to perform a path MTU size determination.

As illustrated in FIG. 6D, in some examples, the MTU size reporting engine 404 in the switch device 204/400 may provide a path MTU size modification communication 604 to the host device 202 that identifies the lowest MTU size supported in the network path by the switch devices 204, 206, and 208, and the path MTU size determination engine 304 in the host device 202/300 will receive that path MTU size modification communication 604 via its communication system 308. The path MTU size determination engine 304 may then operate to modify its path MTU size to the lowest MTU size supported in the network path by the switch devices 204, 206, and 208 (e.g., in the path MTU size determination database 306.) In other examples, the MTU size reporting engine 404 in the switch device 204/400 may operate to modify the path MTU size for the host device 202 to the lowest MTU size supported in the network path by the switch devices 204, 206, and 208 (e.g., in the path MTU size determination database 306 via direct access to that database.) While a few examples have been provided, one of skill in the art in possession of the present disclosure will recognize that the telemetry source switch device may cause the source host device to modify its path MTU size to the lowest MTU size supported in the network path in a variety of manners that will fall within the scope of the present disclosure as well. As such, following block 512, the host device 202 may communicate with the host device 210 via the network path provided by the switch devices 204, 206, and 208 via packets having its modified path MTU size such that those packet are transmitted via the network path without the need to fragment those packets. While illustrated as being performed for a single network path, one of skill in the art in possession of the present disclosure will recognize how the method 500 may be performed for multiple network paths between a source host device and destination host device, which may allow for a variety of functionality including, for example, the source host device selecting a network path to a destination host device based on that network path being associated with the highest path MTU size.

In many embodiments, the path MTU size determination system of the present disclosure may implement a variety of features that provide for backwards compatibility with conventional path MTU size determination systems. For example, timer-based backwards compatibility subsystems may be implemented in the path MTU size determination system of the present disclosure by configuring switch device(s) that provide the network path between the host devices to start an acknowledgement timer when forwarding the path MTU size determination packet. As such, an "upstream" switch device may be configured to start an acknowledgement timer upon forwarding the path MTU size determination packet in the manner described above, and a "downstream" switch device that is capable of receiving and processing that path MTU size determination packet may be configured to generate and transmit an L2 acknowledgement communication associated with the receipt of the path MTU size determination packet to the upstream switch device and towards the source host device. Thus, if the upstream switch device receives the acknowledgement packet within some time period after forwarding the path MTU size determination packet (as determined by the acknowledgement timer started by that upstream switch device as discussed above), the upstream switch device (e.g., a P4 INT neighbor to the downstream switch device in systems that utilize INT headers) may reset its acknowledgement timer. In the event the acknowledgement timer started by the upstream switch device expires after forwarding the path MTU size determination packet and without receiving an acknowledgement message from the downstream switch device, the upstream switch device may transmit a packet loss notification to the telemetry sink switch device (e.g., indicating a silent packet loss)

As will be appreciated by one of skill in the art in possession of the present disclosure, a downstream switch device that provides the network path between host devices may not support the MTU size reporting header/INT header functionality discussed above, and thus the failure of an upstream switch device to receive an acknowledgement message from a downstream switch device following the sending of a path MTU size determination packet may allow the upstream switch device to detect that and notify the telemetry sink device. In some embodiments, the failure to receive an acknowledgement message from a downstream switch device following the sending of a path MTU size determination packet may also cause the upstream switch device to identify the lowest MTU size that was reported in the path MTU size determination packet that it received (e.g., prior to forwarding that path MTU size determination packet to the downstream switch device that may have dropped it), and report that lowest MTU size to the telemetry source device/source host device similarly as discussed above, which one of skill in the art in possession of the present disclosure will recognize may be used by the source host device to adjust their path MTU size to such that it is lower than that lowest MTU size identified by the upstream switch device in the hopes that the path MTU size is now low enough for the downstream switch device to successfully process and forward the path MTU size determination packet.

In another example, state-based backwards compatibility subsystems may be implemented in the path MTU size determination system of the present disclosure by configuring switch device(s) that provide the network path between the host devices to identify the MTU size of the last successful packet received from an intermediate switch device (e.g., the next hop router) or the destination host device if that MTU size is different from the MTU size supported by that switch device. When those switch devices receive a path MTU size determination packet that is larger than the identified MTU size of that last successful packet received from an intermediate switch device or the destination host device, it may operate to truncate path MTU size determination packets to that identified size of that last successful packet received from the intermediate switch device or the destination host device, which prevents the sending of packets with MTU sizes that are not supported by downstream switch devices, and provides for the convergence of the path MTU size to an MTU size supported by all the switch devices that provide the network path. As will be appreciated by one of skill in the art in possession of the present disclosure, this state-based backwards compatibility option assumes L2 path symmetry (e.g., that switch devices support receiving packets having an MTU size equal to the packets they send), which has been found to work in most cases.

In another example, stateless backwards compatibility subsystems may be implemented in the path MTU size determination system of the present disclosure by configuring switch device(s) that provide the network path between the host devices to truncate the payload of the path MTU size determination packet after adding its MTU size to the INT header, as discussed above, as well as send its supported MTU size in a follow-up packet to the telemetry source switch device, which allows the source host device to adjust its path MTU size to a level less that the lowest MTU size reported to it by a switch device via a follow-up packet. One of skill in the art in possession of the present disclosure will recognize that, in the event an L2 switch device drops a previously sent path MTU size determination packet, this may allow a subsequently sent path MTU size determination packet to be sent with a path MTU size that is supported by that L2 switch.

Thus, systems and methods have been described that provide for the determination of a path MTU size via the transmission of a reduced number of path MTU size determination packet(s) along a network path. For example, path MTU size determination packets generated by source host devices may be provided with In-band Network Telemetry (INT) headers (added by the source host device or a telemetry source switch device that is directly connected to the source host device), and switch devices in the network path that receive the path MTU size determination packet will provide their switch identifiers along with their supported MTU size in the INT header, and forward the path MTU size determination packet. When a telemetry sink switch device in the network path (e.g., that is directly connected to the destination host device) receives the path MTU size determination packet, it may determine a lowest MTU size supported in the network path (i.e., out of the MTU sizes reported in the INT header in the path MTU size determination packet and the MTU size supported by the telemetry sink switch device), and report that lowest MTU size to the telemetry source switch device. The telemetry source sink device then causes the source host device to change its path MTU size to the lowest MTU size supported by the network path. As such, the path MTU size determination system of the present disclosure eliminates the iterative path MTU discovery operations performed in conventional path MTU size determination systems, and allows for the determination of MTU sizes supported by L2 switch devices that provide the network path.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A path Maximum Transmission Unit (MTU) size determination system, comprising:
a destination host device;
a source host device that is configured to generate and transmit a path Maximum Transmission Unit (MTU) size discovery packet; and
a plurality of switch devices coupling the destination host device to the source host device to provide a network path, wherein the plurality of switch devices include a first switch device that is directly connected to the source host device and second switch device that provides a portion of a network path between the source host device and the destination host device, and wherein the first switch device is configured to:
receive the path MTU size discovery packet generated and transmitted by the source host device;
provide a first switch identity of the first switch device and a first MTU size supported by the first switch device in a MTU size reporting header included in the MTU size discovery packet; and
forward the path MTU size discovery packet to another of the plurality of the second switch device; and
wherein the second switch device is configured to:
receive the path MTU size discovery packet from the first switch device;
provide a second switch identity of the second switch device and a second MTU size supported by the second switch device in the MTU size reporting header included in the MTU size discovery packet; and
forward the path MTU size discovery packet.

2. The system of claim 1, wherein the source host device is configured to:
add the MTU size reporting header to the MTU size discovery packet.

3. The system of claim 1, wherein the first switch device is configured to:
add the MTU size reporting header to the MTU size discovery packet.

4. The system of claim 1, wherein the plurality of switch devices include a third switch device that is directly connected to the destination host device, wherein the third switch device is configured to:
receive the path MTU size discovery packet forwarded by the second switch device;
determine a lowest MTU size in the MTU size reporting header; and
identify the lowest MTU size to the first switch device.

5. The system of claim 4, wherein the first switch device is configured to:
cause the source host device to provide the lowest MTU size as a path MTU size utilized by the source host device.

6. The system of claim 1, wherein at least one of the plurality of switch devices is Layer 2 (L2) switch device.

7. An Information Handling System (IHS), comprising:
a processing system; and
a memory system that is coupled to the processing system and that includes instructions that, when executed by the processing system, cause the processing system to provide a Maximum Transmission Unit (MTU) size reporting engine that is configured to:
receive a path MTU size discovery packet that was generated and transmitted by a source host device along a network path to a destination host device, wherein the path MRU size discovery packet includes an MTU size reporting header having:
a first switch identity that was provided in MTU size reporting header by a first switch device included in the network path prior to the MTU size reporting engine receiving the path MTU size discovery packet; and
a first MTU size supported by the first switch device that was provided in the MTU size reporting header by the first switch device prior to the MTU size reporting engine receiving the path MTU size discovery packet;
provide a second switch identity of the IHS and a second MTU size supported by the IHS in the MTU size reporting header included in the MTU size discovery packet; and
forward the path MTU size discovery packet to a third switch device in the network path.

8. The IHS of claim 7, wherein the MTU size reporting header included in the MTU size discovery packet was provided in the MTU size discovery packet by the source host device.

9. The IHS of claim 7, further comprising:
the first switch device, wherein the first switch device is configured to:
receive the MTU size discovery packet directly from the source host device; and
add the MTU size reporting header to the MTU size discovery packet.

10. The IHS of claim 7, further comprising:
the third switch device, wherein the third switch device is configured to:
determine a lowest MTU size in the MTU size reporting header; and
identify the lowest MTU size to the first switch device that is directly connected to the source host device.

11. The IHS of claim 7, further comprising:
the first switch device, wherein the first switch device is configured to:
receive an identification of the lowest MTU size in the MTU size reporting header from the third switch device that is directly connected to the destination host device; and
cause the source host device to provide the lowest MTU size as a path MTU size utilized by the source host device.

12. The IHS of claim 7, wherein the MTU size reporting engine is configured to:
perform at least one Layer 2 (L2) switching function.

13. The IHS of claim 7, wherein the MTU size reporting header is an In-band Network Telemetry (INT) header.

14. A method for determining a path MTU size, comprising:
receiving, by a first switch device that provides a portion of a network path between a source host device and a destination host device, a path Maximum Transmission Unit (MTU) size discovery packet generated and transmitted by the source host device;

providing, by the first switch device, a first switch identity of the first switch device and a first MTU size supported by the first switch device in an MTU size reporting header included in the MTU size discovery packet;

forwarding, by the first switch device to a second switch device that provides a portion of the network path between the source host device and the destination host device, the path MTU size discovery packet;

receiving, by the second switch device from the first switch device, the path MTU size discovery packet;

providing, by the second switch device, a second switch identity of the second switch device and a second MTU size supported by the second switch device in the MTU size reporting header included in the MTU size discovery packet; and forwarding, by the second switch device to a third switch device that provides a portion of the network path between the source host device and the destination host device, the path MTU size discovery packet.

15. The method of claim 14, wherein the MTU size discovery packet is received by the first switch device directly from the source host device and the MTU size reporting header is included in the MTU size discovery packet when the MTU size discovery packet is received.

16. The method of claim 14, further comprising:

receiving, by the first switch device that is directly connected to the source host device, the MTU size discovery packet; and adding, by the first switch device, the MTU size reporting header to the MTU size discovery packet.

17. The method of claim 14, further comprising:

receiving, by the third switch device that is directly connected to the destination host device from the second switch device, the path MTU size discovery packet;

determining, by the third switch device, a lowest MTU size in the MTU size reporting header; and identifying, by the third switch device, the lowest MTU size to a fourth switch device that is directly connected to the source host device.

18. The method of claim 14, further comprising:

receiving, by the first switch device that is directly connected to the source host device, an identification of the lowest MTU size in the MTU size reporting header from a fourth switch device that is directly connected to the destination host device; and causing, by the first switch device, the source host device to provide the lowest MTU size as a path MTU size utilized by the source host device.

19. The method of claim 14, wherein the first switch device is a Layer 2 (L2) switch device.

20. The method of claim 14, wherein the MTU size reporting header is an In-band Network Telemetry (INT) header.

* * * * *

UNITED STATES PATENT AND TRADEMARK OFFICE
CERTIFICATE OF CORRECTION

PATENT NO. : 11,405,325 B2
APPLICATION NO. : 16/432736
DATED : August 2, 2022
INVENTOR(S) : Karuppiah et al.

It is certified that error appears in the above-identified patent and that said Letters Patent is hereby corrected as shown below:

In the Claims

Claim 1, Column 13, Line 24, "second switch device" should be changed to --a second switch device--;

Claim 1, Column 13, Lines 34 and 35, "forward the path MTU size discovery packet to another of the plurality of the second switch device; and" should be changed to --forward the path MTU size discovery packet to the second switch device; and--.

Signed and Sealed this
Eleventh Day of October, 2022

Katherine Kelly Vidal
*Director of the United States Patent and Trademark Office*